United States Patent
English

(10) Patent No.: US 10,723,186 B1
(45) Date of Patent: Jul. 28, 2020

(54) TRAILER DAMPENING SYSTEM

(71) Applicant: Lane L. English, Texarkana, TX (US)

(72) Inventor: Lane L. English, Texarkana, TX (US)

( * ) Notice: Subject to any disclaimer, the term of this patent is extended or adjusted under 35 U.S.C. 154(b) by 0 days.

(21) Appl. No.: 16/587,918

(22) Filed: Sep. 30, 2019

(51) Int. Cl.
*B60D 1/24* (2006.01)
*B60D 1/48* (2006.01)
*B62D 63/08* (2006.01)
*B62D 33/02* (2006.01)

(52) U.S. Cl.
CPC .............. *B60D 1/249* (2013.01); *B60D 1/48* (2013.01); *B62D 33/02* (2013.01); *B62D 63/08* (2013.01)

(58) Field of Classification Search
CPC .......... B60D 1/249; B60D 1/48; B60D 1/322; B60D 1/32
USPC ................................................ 280/474, 417.1
See application file for complete search history.

(56) References Cited

U.S. PATENT DOCUMENTS

| | | | | |
|---|---|---|---|---|
| 7,530,591 B2* | 5/2009 | Mater, Jr. | .................. | B60D 1/50 280/416.1 |
| 9,802,452 B1* | 10/2017 | McCall | .................. | B60D 1/249 |
| 2003/0214116 A1* | 11/2003 | Rehme | ..................... | B60D 1/50 280/488 |
| 2008/0029996 A1* | 2/2008 | Mater, Jr. | ............... | B60D 1/249 280/474 |
| 2013/0175786 A1* | 7/2013 | Curl | .................... | B62D 53/0828 280/439 |
| 2019/0030969 A1* | 1/2019 | Borkholder | ............ | B60D 1/248 |

* cited by examiner

*Primary Examiner* — Tony H Winner
(74) *Attorney, Agent, or Firm* — Law Office of Jeff Williams PLLC; J. Oliver Williams

(57) ABSTRACT

A dampening system is configured to isolate and dampen vibrations from transferring between a towing vehicle and gooseneck trailer. The system includes a neck support structure, a gooseneck having a coupling, a trailer mounting structure, the trailer mounting structure in communication with the neck support structure based on one or more hinges, a set of air bladders, wherein the air bladders are in communication with the neck support structure and the trailer mounting structure, and a flatbed, wherein the flatbed is in communication with the trailer mounting structure.

17 Claims, 4 Drawing Sheets

TRAILER DAMPENING SYSTEM

BACKGROUND

1. Field of the Invention

The present application relates to the field of trailers, and more particularly to gooseneck trailers.

2. Description of Related Art

Gooseneck trailers are truck trailers ideal for transporting loads ranging between 10,000 and 30,000 pounds and are typically used in the agricultural and industrial industries. Gooseneck trailers are connected to a truck through a gooseneck hitch located generally in the middle of the truck bed, which allows the truck to make sharper turns compared to trucks that use general receiver hitches that are located at the furthest rear of a truck.

While gooseneck trailers and hitches offer better maneuverability for a towing truck, the use of gooseneck trailers on uneven, dirt, or gravel roads can become a shaky endeavor. For instance, a truck coupled with a gooseneck trailer that runs over a modest pothole will feel vibrational effects throughout the truck-trailer system until the truck-trailer has completely passed the pothole: as the wheels of the truck pass over the pothole, vibrations from the suspension of the truck are transferred to the trailer and subsequent cargo; and as the wheels of the trailer pass over the pothole, vibrations from the suspension of the trailer are transferred to the truck and subsequent crew. As such, the crew and the cargo of the truck-trailer system must endure prolonged vibrations until the pothole has passed, thus an improved gooseneck trailer having a dampening system that reduces the transfer of vibrations between the truck-trailer coupling is desired.

SUMMARY OF THE INVENTION

Embodiments of the present invention disclose a dampening system that isolates and dampens vibrations from transferring between a towing vehicle and gooseneck trailer. In one embodiment of the present invention, an assembly is provided comprising: a neck support structure, wherein the neck support structure is a planar body having a front face, a back face, a ground edge, a distal edge, and a set of flanking edges; a gooseneck having a first end and a second end, wherein a coupling is located at the first end of the gooseneck, the coupling configured to receive a gooseneck trailer hitch associated with a towing vehicle, and wherein the second end of the gooseneck is in communication with the front face of the neck support structure and is proximate to the distal edge of the neck support structure; a trailer mounting structure, wherein the trailer mounting structure is a planar body having a front face, a back face, a ground edge, a distal edge, and a set of flanking edges, wherein the trailer mounting structure is in communication with the neck support structure based on one or more hinges axially aligned and located along the back face of the neck support structure proximate to the ground edge and along the front face of the trailer mounting structure proximate to the ground edge; a set of air bladders each having a first end and a second end, wherein the first end of each air bladder is in communication with the neck support structure located on the back face proximate to the distal edge of the neck support structure, and wherein the second end of each air bladder is in communication with the trailer mounting structure located on the front face proximate to the distal edge of the trailer mounting structure; and a flatbed having a front edge, wherein the front edge of the flatbed is in communication with the trailer mounting structure located on the back face proximate to the ground edge of the trailer mounting structure.

Ultimately the invention may take many embodiments. In these ways, the present invention overcomes the disadvantages inherent in the prior art.

The more important features have thus been outlined in order that the more detailed description that follows may be better understood and to ensure that the present contribution to the art is appreciated. Additional features will be described hereinafter and will form the subject matter of the claims that follow.

Many objects of the present application will appear from the following description and appended claims, reference being made to the accompanying drawings forming a part of this specification wherein like reference characters designate corresponding parts in the several views.

Before explaining at least one embodiment of the present invention in detail, it is to be understood that the embodiments are not limited in its application to the details of construction and the arrangements of the components set forth in the following description or illustrated in the drawings. The embodiments are capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present design. It is important, therefore, that the claims be regarded as including such equivalent constructions in so far as they do not depart from the spirit and scope of the present application.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
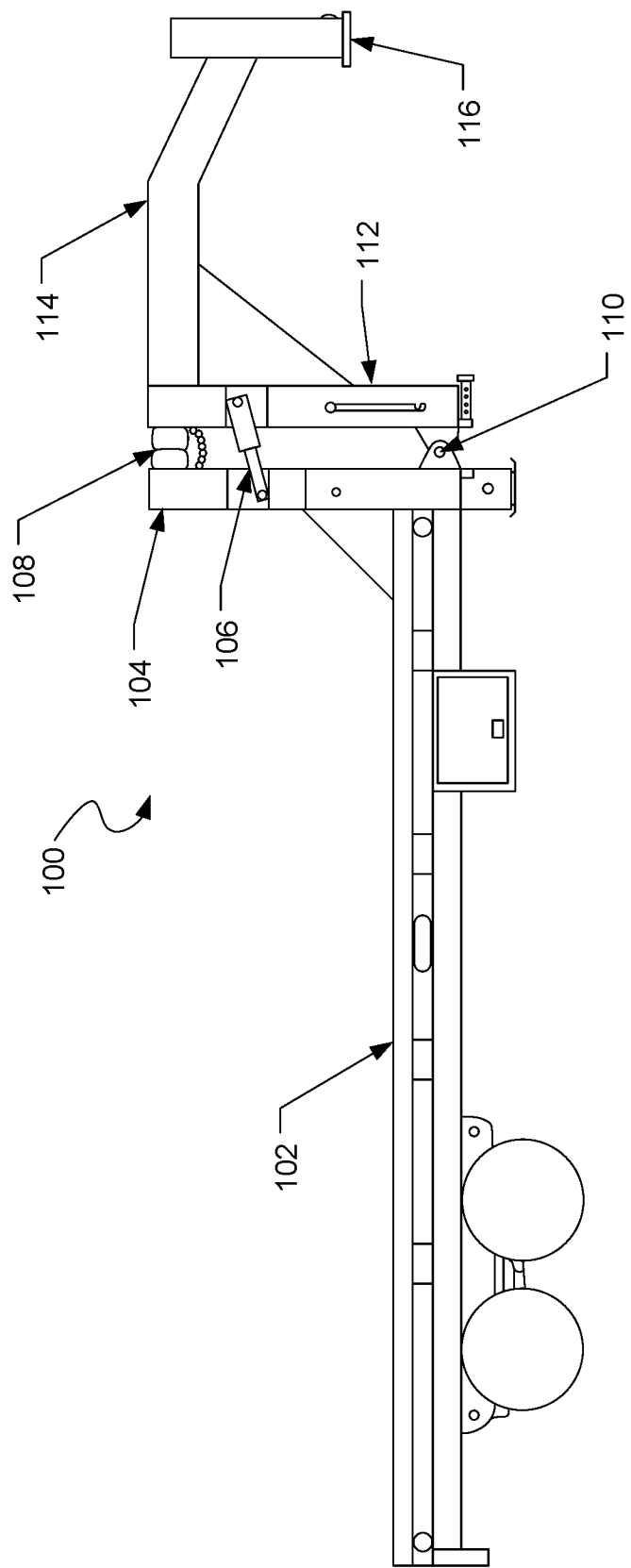
FIG. 1 is a side view of a gooseneck trailer having a dampening system, in accordance with an embodiment of the present invention.

While the embodiments and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the embodiments described herein may be oriented in any desired direction.

The system in accordance with the present invention overcomes one or more of the above-discussed problems commonly associated with traditional gooseneck trailers. In particular, the system of the present invention is a trailer dampening system, configured for a gooseneck trailer, having a set of airbladders and a set of shock absorbers that absorb vibrations that occur between a gooseneck trailer and a towing vehicle. The system further comprises a set of emergency chains with corresponding spring bolts that prevent over extension of the set of airbladders and the set of shock absorbers, and one or more latches and corresponding latch pins for locking the trailer damping system during trailer and towing vehicle separation. These and other unique features of the system are discussed below and illustrated in the accompanying drawings.

The system will be understood from the accompanying drawings, taken in conjunction with the accompanying description. Several embodiments of the system may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application is illustrated in the associated drawings. As used herein, "system" and "assembly" are used interchangeably. As used herein, a "fastener" is a rod-like hardware device that mechanically joins or affixes two or more members together through a respective concentric set of apertures. For example, a fastener can be a screw, bolt, nail, stud, dowel, rivet, staple, etc. in conjunction with any applicable nuts and washers generally known in the art of fastening. It should be noted that the articles "a", "an", and "the", as used in this specification, include plural referents unless the content clearly dictates otherwise. As used herein, "front" and "back" are relative directions from the perspective, wherein "front" is in a direction towards of a coupling that connects to a towing vehicle, and wherein "back" is in an opposing direction of "front". As used herein, a "towing vehicle" is any vehicle, machine, or device capable of receiving a gooseneck coupling associated with a gooseneck trailer. As used herein, a "ground edge" is a planar face of a body that faces a ground or a road, and "distal edge" is a planar face of the body that is opposite of the ground edge. Additional features and functions are illustrated and discussed below.

Figure 2:
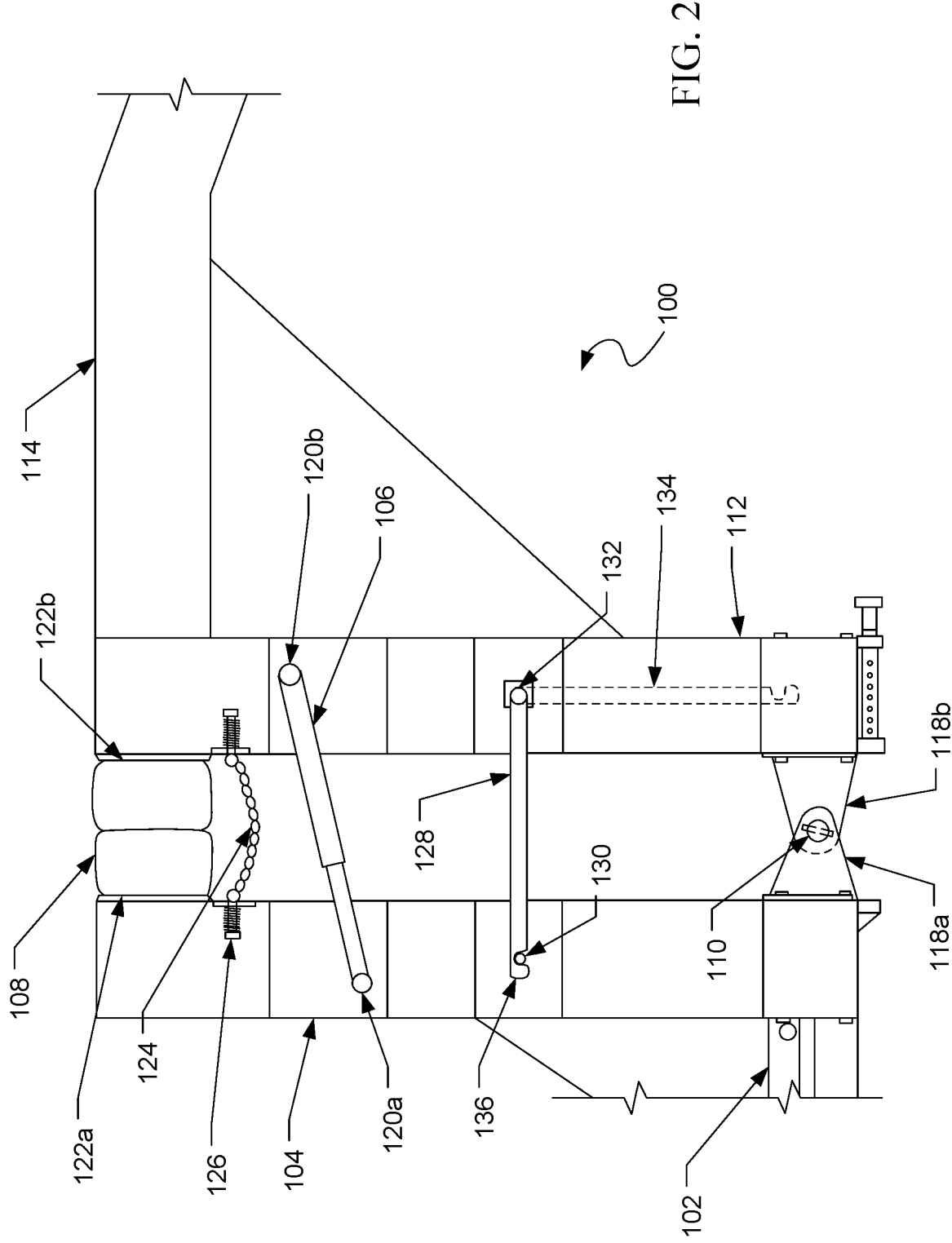
FIG. 2 is a detailed side view of the dampening system of FIG. 1.
Figure 3:
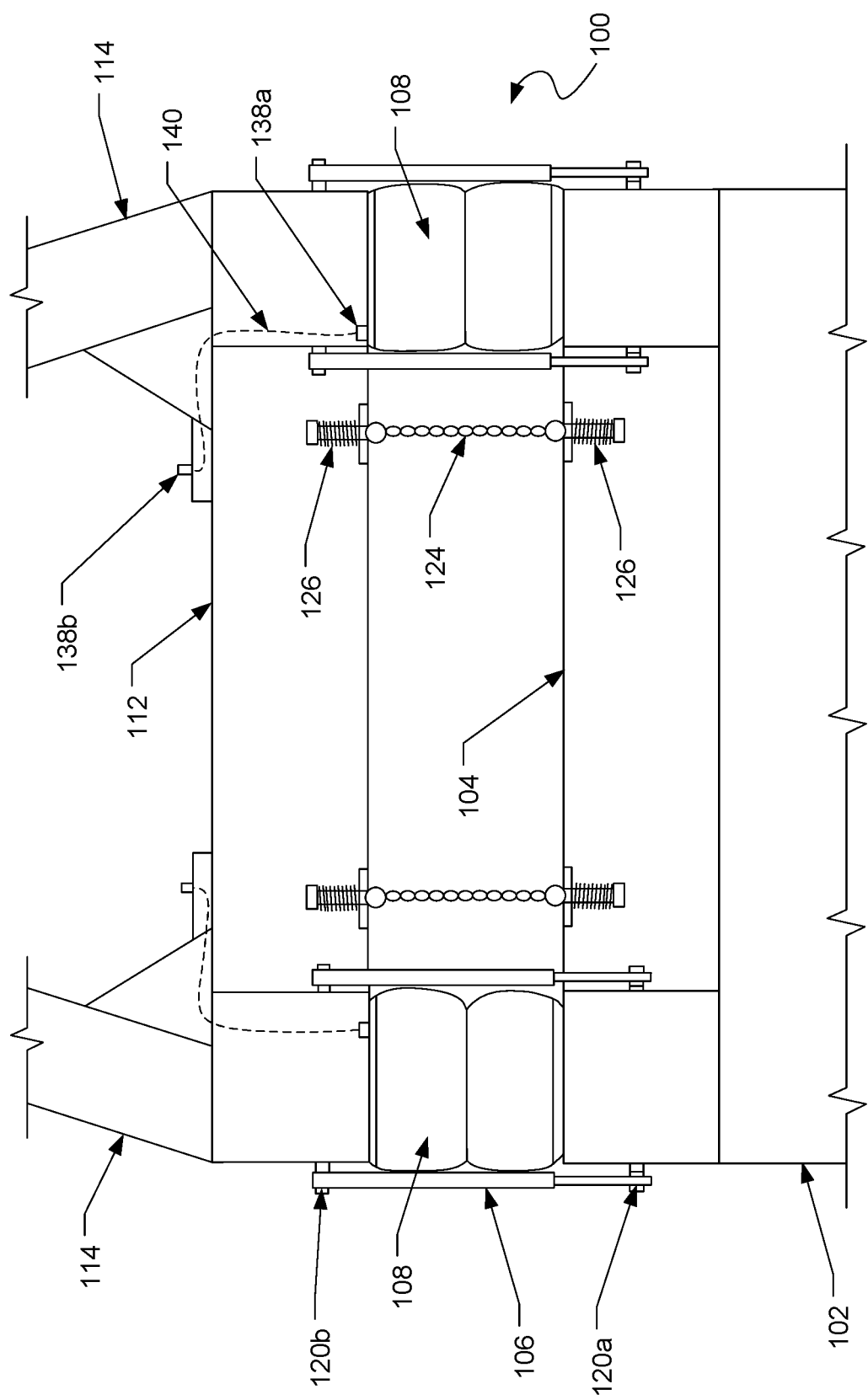
FIG. 3 is a top view of the dampening system of FIG. 1.
Figure 4:
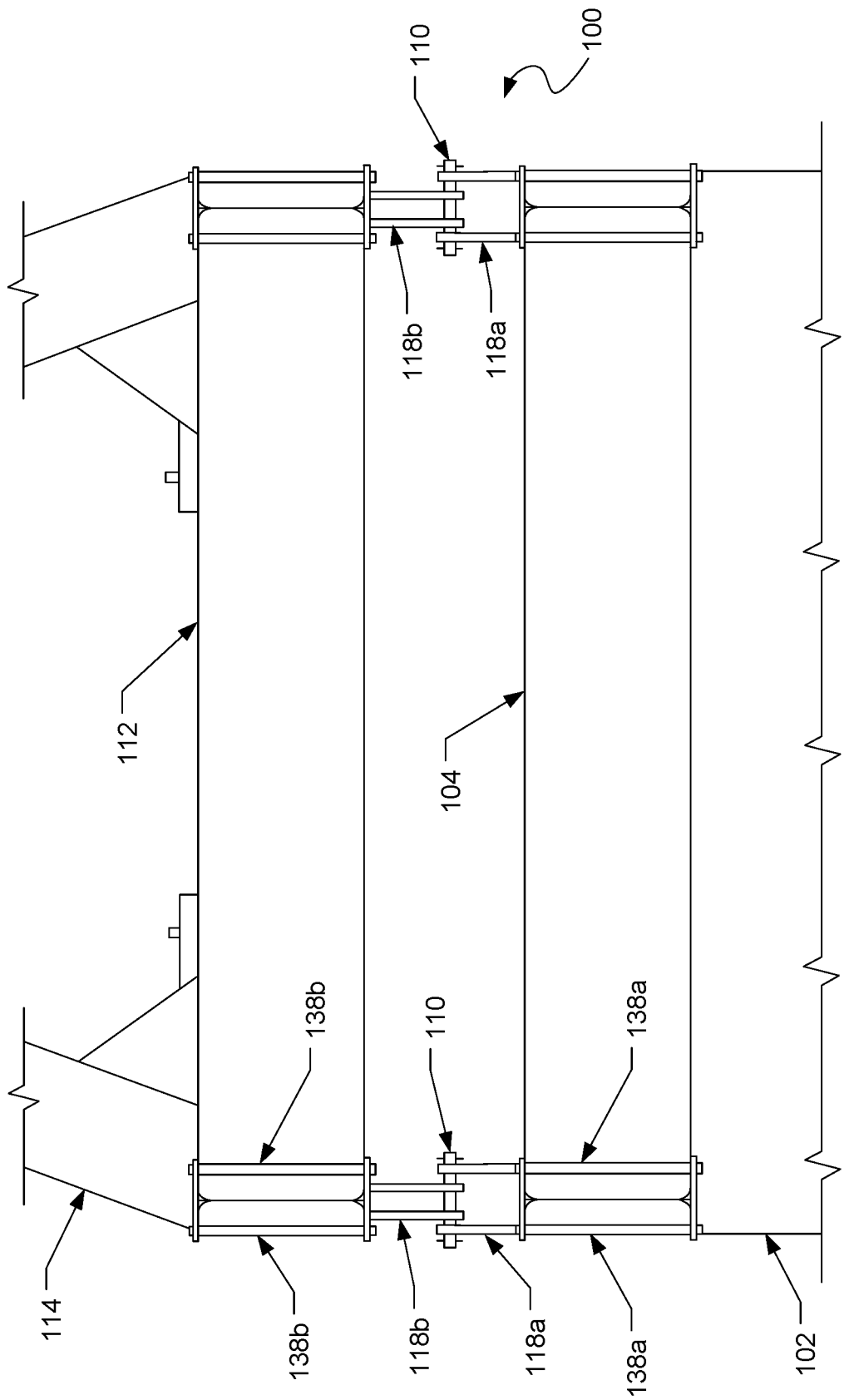
FIG. 4 is a bottom view of the dampening system of FIG. 1.

Referring now to the drawings wherein like reference characters identify corresponding or similar elements in form and function throughout the several views. FIGS. 1-4 illustrate assorted views of a trailer dampening system. FIG. 1 illustrates a side view of a gooseneck trailer having the dampening system, and FIGS. 2-4 are detailed side view, a top view, and a bottom view of the dampening system.

Referring now to FIG. 1, a side view of gooseneck trailer 100 is illustrated in accordance with an embodiment of the present invention.

In FIG. 1, gooseneck trailer 100 is a gooseneck trailer modified to employ a dampening system. Gooseneck trailer 100 includes, but is not limited to, a trailer flatbed (i.e., flatbed 102), a trailer support structure (i.e., trailer support structure 104), a neck support structure (i.e., neck support structure 112), a gooseneck (i.e., gooseneck 114), a coupler (i.e., coupler 116), a set of airbladders (i.e., airbladders 108), a set of shock absorbers (i.e., shocks 106), and a set of hinges (i.e., hinges 110).

Trailer support structure 104 and neck support structure 112 are planar bodies each having a front face, a back face, a ground edge, a distal edge, and a set of flanking edges. In one embodiment, trailer support structure 104 and/or neck support structure 112 comprises of one or more vertical members and one or more horizontal members that form the planar body, the set of flanking edges being associated with a set of sides other than the front face and the back face of the vertical members. In one embodiment, the one or more vertical members and the one or more horizontal members are I-beams. In another embodiment, trailer support structure 104 and/or neck support structure 112 are each a boxed I-beam structure. In another embodiment, the one or more vertical members and the one or more horizontal members are hollow metal rectangular box-like structures.

In this embodiment, trailer support structure 104 is in communication with neck support structure 112 based on one or more axially aligned hinges (i.e., hinge 110). In this embodiment, the one or more axially aligned hinges is connected to neck support structure 112 along the back face of neck support structure 112 proximate to the ground edge, and further connected to trailer support structure 104 along the front face of trailer support structure 112 proximate to the ground edge. Hinge 110 is further illustrated and described with respect to FIGS. 2 and 4.

Flatbed 102 is traditionally known in the art of trailers as being a flat area structure in communication with a set of axles and corresponding wheels, the combination being capable of supporting a cargo load. In this embodiment, the flatbed has a front edge adjacent to the flat area, wherein the front edge of the flatbed is in communication with trailer mounting structure 104 located on the back face proximate to the ground edge of trailer mounting structure 104.

Gooseneck 114 is a gooseneck structure typically seen with gooseneck trailers. In this embodiment, gooseneck 114 is a cantilevered A-framed member having a first end located at a vertex of the A-frame and a second end, wherein a coupling is located at the first end of the gooseneck, and wherein the second end of the gooseneck is in communication with the front face of neck support structure 112 and is proximate to the distal edge of neck support structure. In this embodiment, the coupling is configured to receive a gooseneck trailer hitch associated with a towing vehicle.

Shocks 106 are shock absorbers generally known in the art for dampening mechanical vibrations. Shocks 106 are a set of shock absorbers each having a first end and a second end, wherein the first end of each shock absorber is in communication with the set of flanking edges of the neck support structure, and wherein the second end of each shock absorber is in communication with the set of flanking edges of the trailer mounting structure. Shocks 106 are illustrated in greater detail with respect to FIGS. 2 and 3.

Air bladders 108 are air bladders that serve as a spring cushion between trailer mounting structure 104 and neck support structure 112. In this embodiment, air bladders 108 are a set of air bladders, wherein each air bladder is a rubber bladder configured to receive compressed air that inflates the air bladder. In this embodiment, each air bladder has a corresponding valve stem located on a surface of the air bladder that is configured to receive a first end of a pneumatic hose, whereby through an air compression system connected to a second end of the pneumatic hose, the air compression system impels air into air bladders 108 via the pneumatic hose and corresponding valve stem of each air bladder. In this embodiment, air bladders 108 each have a first end and a second end, wherein the first end of each air bladder is in communication with neck support structure 112 located on the back face proximate to the distal edge of neck support structure 112, and wherein the second end of each air bladder is in communication with trailer mounting structure 104 located on the front face proximate to the distal edge of trailer mounting structure 104. In some embodiments, air bladders 108 is a set of air bladders generally used for vehicular air suspension systems. Air bladders 108 are illustrated in greater detail with respect to FIGS. 2 and 3.

Referring now to FIG. 2, a detailed side view of gooseneck trailer 100 is illustrated in accordance with an embodiment of the present invention.

In this embodiment, shocks 106 are illustrated as having a first end (i.e., end 120b) and a second end (i.e., end 120a), wherein the first end of each shock absorber is in communication with the set of flanking edges of the neck support structure, and wherein the second end of each shock absorber is in communication with the set of flanking edges of the trailer mounting structure.

Furthermore, air bladders 108 each have a first end (i.e., end 122b) and a second end (i.e., end 122a), wherein the first end of each air bladder is in communication with neck support structure 112 located on the back face proximate to the distal edge of neck support structure 112, and wherein the second end of each air bladder is in communication with trailer mounting structure 104 located on the front face proximate to the distal edge of trailer mounting structure 104.

Even furthermore, hinges 110 is shown as being connected to neck support structure 112 along the back face of neck support structure 112 proximate to the ground edge, and further connected to trailer support structure 104 along the front face of trailer support structure 112 proximate to the ground edge. In this embodiment, hinges 110 are formed using a first set of hinge plates (i.e., plates 118a) connected to trailer mounting structure 104, and a second set of hinge plates (i.e., plate 118b) wherein the first set of hinge plates and the second set of hinge plates connected to neck support structure 112. Each of the hinges plates of the first set of hinge plates and the second set of hinge plates have an aperture configured to receive one or more hinge pins, whereby the collection one or more hinge pins and corresponding apertures permit hinge plates 118a and hinge plates 118b to pivot with respect to the one or more hinge pins, subsequently permitting neck support structure 112 and trailer support structure 104 to pivot with respect to hinges 110.

In one embodiment, neck support structure 112 has one or more latches (i.e., latch 128) for locking neck support structure 112 to trailer mounting structure 104, thereby preventing pivoting with respect to hinges 110. In this embodiment, latch 128 has a first end (i.e., end 132) and a second end (i.e., end 136), wherein latch 128 is pivotably connected to a flanking edge of the set of flanking edges of neck support structure 112. Furthermore, latch 128 has a notch configured to receive a latch pin (i.e., latch pin 130) wherein the notch is located proximate to the second end of latch 128. In one embodiment, trailer mounting structure 104 has one or more latch pins corresponding to the one or more latches, wherein the one or more latch pins are located on the set of flanking edges of trailer mounting structure 104. In this embodiment, while latch 128 is decoupled from trailer mounting structure 104, latch 128 rests along the body of neck support structure 112 as indicated by rest position 134.

In an alternate embodiment, latch 128 is pivotably connected to a flanking edge of the set of flanking edges of trailer mounting structure 104, and a corresponding one or more latch pins are located on the set of flanking edges of neck support structure 112.

In one embodiment, a set of emergency chains (i.e., chains 124) each having a first end and a second end, are connected to trailer mounting structure 104 and neck support structure 112 via a corresponding set of spring bolts (i.e., spring bolts 126), whereby the combination of the set of emergency chains and corresponding set of spring bolts prevent angular overextension between trailer mounting structure 104 and neck support structure 112 respective to hinges 110. In this embodiment, each first end of the set of emergency chains is in communication with a corresponding first set of springs bolts, and each second end of the set of emergency chains is in communication with a corresponding second set of spring bolts. In this embodiment, the first set of spring bolts each have a first stop plate, wherein the first stop plate is in communication with the back face of neck support structure 112, and each of the first set of spring bolts is under spring tension against the corresponding first stop plate. Likewise, the second set of spring bolts each have a second stop plate, wherein the second stop plate is in communication with the front face of trailer mounting structure 104, and each of the second set of spring bolts is under spring tension against the corresponding second stop plate.

In one embodiment, each emergency chain and corresponding spring bolts, while the spring bolts are compressed against the corresponding stop plates, have a combined length that is less than a maximum extension length of the set of the set of shock absorbers and a maximum extension length of the set of air bladders.

Referring now to FIG. 3, a top view of gooseneck trailer 100 is illustrated in accordance with an embodiment of the present invention.

In one embodiment, each air bladder has a corresponding first valve stem (i.e., valve stem 138a) located on a surface of the air bladder that is configured to receive a first end of an intermediary pneumatic hose (i.e., hose 140), whereby the intermediary hose passes through the hollow body of neck support structure 112 and connects to a second valve stem (i.e., valve stem 138b) located on the front face of neck support structure 112. Furthermore, valve stem 138b is configured to receive a pneumatic hose (not shown) wherein the pneumatic hose provides compressed air from an air compression system (not shown).

Referring now to FIG. 4, a bottom view of gooseneck trailer 100 is illustrated in accordance with an embodiment of the present invention.

In this embodiment, trailer support structure 104 is in communication with neck support structure 112 based on one or more axially aligned hinges (i.e., hinge 110). For example, as illustrated in FIG. 4, gooseneck trailer 100 has two hinges axially aligned that permit trailer support structure 104 and neck support structure 112 to pivot with respect to the two hinges. In this example, the two hinges have a first set of hinge plates and a second set of hinge plates (i.e., plates 118a and 118b respectively) connected to trailer mounting structure 104 and neck support structure 112 respectively, whereby plates 118a are connected to trailer mounting structure 104 using a set of fasteners (i.e., bolts 138a), and plates 118b are connected to neck support structure using a set of fasteners (i.e., bolts 138b).

Now in reference gooseneck trailer 100 demonstrating a dampening process utilizing the components described above: while gooseneck trailer 100 is coupled to a towing vehicle, mechanical vibrations originating from gooseneck trailer 100 or the towing vehicle results in trailer mounting structure 104 and neck support structure 112 to angularly oscillate based on hinges 110. The angular oscillations of trailer mounting structure 104 and neck support structure 112 are springly cushioned by air bladders 108 while shocks 106 dissipate mechanical energy from the angular oscillations as heat.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A dampening system for a gooseneck trailer comprising:
    a neck support structure, wherein the neck support structure is a planar body having a front face, a back face, a ground edge, a distal edge, and a set of flanking edges;
    a gooseneck having a first end and a second end, wherein a coupling is located at the first end of the gooseneck, the coupling configured to receive a gooseneck trailer hitch associated with a towing vehicle, and wherein the second end of the gooseneck is in communication with the front face of the neck support structure and is proximate to the distal edge of the neck support structure;
    a trailer mounting structure, wherein the trailer mounting structure is a planar body having a front face, a back face, a ground edge, a distal edge, and a set of flanking edges, wherein the trailer mounting structure is in communication with the neck support structure based on one or more hinges axially aligned and located along the back face of the neck support structure proximate to the ground edge and along the front face of the trailer mounting structure proximate to the ground edge;
    a set of air bladders each having a first end and a second end, wherein the first end of each air bladder is in communication with the neck support structure located on the back face proximate to the distal edge of the neck support structure, and wherein the second end of each air bladder is in communication with the trailer mounting structure located on the front face proximate to the distal edge of the trailer mounting structure; and
    a flatbed having a front edge, wherein the front edge of the flatbed is in communication with the trailer mounting structure located on the back face proximate to the ground edge of the trailer mounting structure.

2. The assembly of claim 1, further comprising:
    a set of emergency chains each having a first end and a second end, wherein each first end of the set of emergency chains is in communication with a corresponding first set of spring bolts, and wherein each second end of the set of emergency chains is in communication with a corresponding second set of spring bolts;
    the first set of spring bolts each having a first stop plate, wherein the first stop plate is in communication with the back face of the neck support structure, and wherein each of the first set of spring bolts is under spring tension against the first stop plate; and
    the second set of spring bolts each having a second stop plate, wherein the second stop plate is in communication with the front face of the trailer mounting structure, and wherein each of the second set of spring bolts is under spring tension against the second stop plate.

3. The assembly of claim 2, wherein each emergency chain and corresponding spring bolts, while the spring bolts are compressed against the corresponding stop plates, have a combined length that is less than a maximum extension length of the set of shock absorbers and a maximum extension length of the set of air bladders.

4. The assembly of claim 1, further comprising:
    a set of valve stems corresponding to the set of air bladders; and
    a set of pneumatic hoses, wherein each pneumatic hose has a first end and a second end, wherein the first end of each pneumatic hose is connected to a corresponding valve stem of the set of valve stems, and wherein the second end of each pneumatic hose is connected to an air compressor system.

5. The assembly of claim 1, further comprising:
one or more latches for locking the neck support structure to the trailer mounting structure thereby preventing pivoting with respect to the one or more hinges, the one or more latches each having a first end and a second end, each latch of the one or more latches having the first end pivotably connected to a flanking edge of the set of flanking edges of the neck support structure, and each latch having a notch configured to receive a latch pin wherein the notch is located proximate to the second end; and
the one or more latch pins, corresponding to the one or more latches, located on the set of flanking edges of the trailer mounting structure.

6. The assembly of claim 1, further comprising:
one or more latches for locking the neck support structure to the trailer mounting structure thereby preventing pivoting with respect to the one or more hinges, the one or more latches each having a first end and a second end, each latch of the one or more latches having the first end pivotably connected to a flanking edge of the set of flanking edges of the trailer mounting structure, and each latch having a notch configured to receive a latch pin wherein the notch is located proximate to the second end of each latch; and
the one or more latch pins, corresponding to the one or more latches, located on the set of flanking edges of the neck support structure.

7. The assembly of claim 1, further comprising:
a shock absorber having a first end and a second end, wherein the first end of the shock absorber is in communication with the set of flanking edges of the neck support structure, and wherein the second end of the shock absorber is in communication with the set of flanking edges of the trailer mounting structure.

8. The assembly of claim 1, wherein the neck support structure is a boxed I-beam structure.

9. The assembly of claim 1, wherein the trailer support structure is a boxed I-beam structure.

10. The assembly of claim 1, wherein the neck support structure is a boxed structure having a hollow body.

11. The assembly of claim 1, wherein the trailer support structure is a boxed structure having a hollow body.

12. A dampening system for a gooseneck trailer, comprising:
a flatbed having a front edge;
a trailer mounting structure coupled to the front edge of the flatbed;
a neck support structure having a gooseneck with a first end and a second end, a coupling is located at the first end for receiving a gooseneck trailer hitch associated with a towing vehicle, the second end of the gooseneck is in communication with a front face of the neck support structure and is proximate to a distal edge of the neck support structure;
an air bladder located between the trailer mounting structure and the neck support structure and configured to dampen effects of vibration during transportation; and
a hinge coupled to the trailer mounting structure and the neck support structure, the neck support structure and the trailer mounting structure configured to pivot relative to one another about an axis of the hinge.

13. The assembly of claim 12, further comprising:
an emergency chain selectively coupled between the neck support structure and the trailer mounting structure to prevent over extension of the air bladder.

14. The assembly of claim 13, wherein the emergency chain includes a spring.

15. The assembly of claim 12, further comprising:
a valve stem corresponding to the air bladder; and
a pneumatic hose, wherein the pneumatic hose extends between an air compressor system and the air bladder.

16. The assembly of claim 12, further comprising:
one or more latches for locking the neck support structure to the trailer mounting structure so as to prevent pivoting therebetween about the hinge.

17. The assembly of claim 12, further comprising:
a shock absorber having a first end and a second end coupled between the neck support structure and the trailer mounting structure.

* * * * *